United States Patent Office 3,019,209
Patented Jan. 30, 1962

3,019,209
BLEND OF VINYL CHLORIDE POLYMER AND BUTADIENE-VINYLIDENE CHLORIDE COPOLYMER
Robert J. Reid, Canal Fulton, and Wendell R. Conard, Kent, Ohio, assignors to The Firestone Tire & Rubber Company, Akron, Ohio, a corporation of Ohio
No Drawing. Filed Dec. 16, 1957, Ser. No. 702,746
3 Claims. (Cl. 260—45.5)

This invention relates to a toughener for rigid polyvinyl chloride resins. The toughener is a copolymer of butadiene and vinylidene chloride.

Substantial quantities of rigid polyvinyl chloride products are on the market. These are referred to herein as vinyl chloride polymers. They have been treated in various ways to improve their low impact strength, often with a lowering of their heat distortion temperature. A relatively small amount of the toughener of this invention, e.g. substantially 2 to 10 percent, based on the weight of the polymer gives very high impact strength without any substantial lowering of the heat distortion temperature. Larger amounts, up to 25 percent, give a semi-flexible sheet or other product. Somewhat larger amounts of high-conversion copolymer tougheners can be used than of low-conversion copolymers. The modulus of the blends of this invention may vary from substantially 100,000 to 400,000 p.s.i. and more.

The toughener of this invention is prepared by copolymerization of a charge of 60 to 90 parts of butadiene and 40 to 10 parts of vinylidene chloride, and carrying the conversion to 60 to 95% completion. The ratio of the butadiene to vinylidene chloride in the copoymer ranges from 60:40 to 95:5. That produced by high conversion, e.g. 75% or more of a charge of 60 parts of butadiene to 40 parts of vinylidene chloride is preferred, and more particularly the toughener which contains about 70 parts of butadiene to 30 parts vinylidene chloride. The copolymer is preferably produced by emulsion polymerization, using a free-radical-generating catalyst.

The toughener copolymer of this invention is preferably used without any liquid plasticizer. The product is then free from the objections which have been found to such plasticizers. Varying amounts of the toughener are added to produce different effects. The invention relates more particularly to the production of rigid blends, and for this purpose the amount of the one or more copolymers added will be substantially 2 to 10 percent. As the amount of toughener is increased over about 7.5 parts per 100 parts of vinyl chloride polymer, the impact strength of the blend decreases. This amount of the copolymer not only toughens the vinyl chloride polymer, increasing its impact strength, but it also serves to plasticize the vinyl chloride polymer and improve its processing.

The rigid vinyl chloride polymers are polymeric resins which may contain up to 15 parts of other monomer such as vinyl acetate or vinylidene chloride. By a rigid vinyl chloride polymer is meant a resin which normally is not plasticized and is prepared for rigid applications such as duct work, sheeting for luggage, etc., and normally has a modulus of 150,000 to 400,000 p.s.i. (Young's bending modulus). There are various rigid vinyl chloride polymers on the market, including Exon 402A (low-molecular-weight vinyl chloride suspension polymerized for rigid application), Marvinol VR–10 (polyvinyl chloride resins, high molecular weight), and Marvinol VR–20 (polyvinyl chloride resins, intermediate molecular weight), Geon 101 (polyvinyl chloride—calendering, extrusion or injection molding—high molecular weight) and Geon 121 (polyvinyl chloride-plastisol resin), and Vinylite QYNA (polyvinyl chloride resin, medium molecular weight). These have somewhat different properties, all having different moduli between about 300,000 and 400,000 p.s.i. The toughener of this invention can be used with any of these and their equivalents.

As illustrative of the invention, a rubber copolymer was prepared as follows:

EXAMPLE I

The following materials were introduced into a stirred reaction vessel and allowed to polymerize at 122° F.

| | Parts by weight |
|---|---|
| Butadiene | 75 |
| Vinylidene chloride | 25 |
| Dodecyl mercaptan | 0.3 |
| Potassium persulfate | 0.22 |
| Dresinate 214 [1] | 4.5 |
| Sodium hydroxide | 0.1 |
| Trisodium phosphate (12 $H_2O$) | 0.5 |
| Water | 180 |

[1] Dresinate 214, an emulsifier, is the potassium salt of disproportionated (dehydrogenated) rosin acid.

The polymerization is advantageously carried out at about 122° F., but temperatures of 40 to 140° F. and thereabouts can be used with modifications in the recipe such as are well known in the art.

The latex reaction was stopped with 0.2 part of hydroquinone after 60 percent conversion, and stabilized with 2 parts of 2,6-dimethyl-4-t butylphenol (on the dry rubber). The latex was coagulated in calcium chloride solution (2%), washed thoroughly and dried overnight at 70° C. This recipe gives a rubber product containing about 18 percent vinylidene chloride.

Five parts and 7.5 parts of this rubber were blended on a mill (heated to about 325° F.) in two different batches, with 100 parts of polyvinyl chloride (Exon 402A). Two parts of cadmium lauryl mercaptide were added to each batch on the mill as a light and heat stabilizer. The materials fused and were milled for 3 minutes. Alternatively, the materials can be mixed in a Banbury, etc. After mixing, the blend can be calendered or milled into a smooth sheet and this may be 0.02 to 0.25 inch thick or thicker.

The foregoing stocks containing 5 and 7.5 parts of toughener respectively, were each taken off the mill at .025 to .038 inch thickness. Each sample was press-polished in a closed mold at 180° C., using 3 minutes of preheat and then 3 minutes of pressure, and then cooled.

The properties of vinyl chloride polymer and of the two blends are recorded in the following table:

*Table 1*

| | Sample 1 | Sample 2 | Sample 3 |
|---|---|---|---|
| Composition (parts by weight): | | | |
| Polyvinyl chloride polymer (Exon 402A) | 100 | 100 | 100 |
| Copolymer | 0 | 5 | 7.5 |
| Impact strength at— | | | |
| 25° C | 0.5 | 2.5 | 14.5 |
| 0° C | 0 | 1.0 | 1.3 |
| −29° C | 0 | 0.7 | 0.9 |
| Rockwell hardness: | | | |
| R scale | 112 | 109 | 105 |
| M scale | 54 | 42 | 36 |
| Heat distortion—°C | 75 | 75 | 75 |
| Youngs modulus—p.s.i. | 410,000 | 401,000 | 411,000 |
| Clarity | (1) | (1) | (2) |

[1] Clear.  [2] Slightly hazy.

The impact strengths recorded are the notched Izod values. The heat distortion refers to 10 mils deflection under 66 p.s.i. loading. The clarity of each sample was determined visually as having one of three values, namely "Clear," "Slightly hazy," and "Hazy."

It is exceptional to find a plastic of any composition which has a high impact strength, high heat distortion and hardness. The above product, containing 7.5 percent of the rubber copolymer toughener, has an exceptionally high impact strength with good heat distortion and hardness and is capable of withstanding a great deal of battering at 25° C. without damage.

EXAMPLE II

Another series of tests was run with copolymer tougheners of different compositions, using different amounts of each with vinyl chloride polymer.

The following recipe was used for production of the various copolymers:

| | Parts by weight |
|---|---|
| Distilled water | 180.0 |
| Soap flakes | 5.0 |
| Potassium persulfate | 0.075 |
| Dodecyl mercaptan | 0.5 |
| Monomers | 100 |

The polymerizations were carried out in the absence of air at 50° C.; and the amount of butadiene and vinylidene chloride used in the preparation of each toughener is indicated in the following table, together with the percent conversion of each reaction, and the percent of vinylidene chloride in each of the resulting copolymers.

| Toughener | Charge | | Conversion, percent | V Cl$_2$ (percent) in product |
|---|---|---|---|---|
| | BD | V Cl$_2$ | | |
| A | 95 | 5 | 65 | |
| B | 90 | 10 | 71 | 7.2 |
| C | 90 | 10 | 97 | 8.86 |
| D | 75 | 25 | 65 | |
| E | 60 | 40 | 73 | 28.3 |
| F | 60 | 40 | 91 | 31.6 |

The resulting latexes were separately coagulated with two percent calcium chloride solution after the addition of 0.2 parts of sodium dimethyl ammonium dithiocarbamate as a stopping agent, and 2 parts of 2,6-di-t-butyl-p-cresol as antioxidant.

Two parts of cadmium lauryl mercaptide was added to 100 parts of suspension-polymerized vinyl chloride polymer (Exon 402A) as a heat stabilizer, and different amounts of the different tougheners were mixed with the stabilized polymer on a mill heated with steam at 100 p.s.i.g. The amounts of the different tougheners (identified as in the foregoing table) added are listed in the following table. The stocks were milled for 3 minutes after fusion, and were than sheeted off at .050 inch. The sheets were plied to 0.1 inch and press-polished at 180° C. The properties of the different sheets were then determined, as recorded in the following table.

Better impact strengths are obtained with polyvinyl chlorides obtained by emulsion polymerization (e.g. with soap or other emulsifier) than with polyvinylchloride obtained by suspension polymerization (e.g. with colloid such as gelatin polyvinylalcohol, etc., which yields the product in pellet form. The table is divided in two parts and gives results obtained with both types of polyvinyl chloride.

| Toughener | | Impact, Izod | Hardness, Rockwell R | Modulus, p.s.i. | Heat Distortion (° C.) |
|---|---|---|---|---|---|
| Sample | Amount, Percent | | | | |
| Suspension-polymerized resin: | | | | | |
| A | 5 | 1.6 | 106 | 386,000 | 77 |
| A | 7.5 | 1.0 | 100 | 311,000 | 76 |
| B | 7.5 | 1.0 | 102 | 282,000 | 76.5 |
| C | 5 | 1.6 | 108 | 334,000 | 77.5 |
| C | 7.5 | 2.6 | 105 | 301,000 | 76.5 |
| C | 15 | 1.1 | 87 | 263,000 | 75.5 |
| D | 5 | 2.5 | 109 | 401,000 | 75 |
| D | 7.5 | 15.7 | 104 | 314,000 | 76 |
| E | 7.5 | 2.3 | 104 | 266,000 | 77.5 |
| E | 15 | 0.9 | 88 | 268,000 | 76 |
| F | 5 | 16.7 | 109 | 368,000 | 77.5 |
| F | 7.5 | 18.4 | 106 | 333,000 | 77 |
| F | 15 | 11.8 | 93 | 267,000 | 75 |
| Control | 0 | 0.3 | 114 | 387,000 | 76.5 |
| Emulsion-polymerized resin: | | | | | |
| F | 2 | 2.2 | 110 | 407,000 | 74.5 |
| F | 5 | 22.7 | 108 | 345,000 | 74 |
| Control | 0 | 0.4 | 112 | 376,000 | 75.5 |

The Izod impact was taken at 25° C. and is given in foot pounds. The foregoing samples all exhibit high impact strength, heat distortion and hardness.

The blend of vinyl chloride polymer and toughener may contain fillers, pigments, stabilizers, etc., as is known in the art.

The invention is covered in the claims which follow.

What we claim is:

1. A blend of 75 to 98 percent by weight of (1) vinyl chloride polymer, and (2) 25 to 2 percent of rubbery copolymer toughener, which toughener is a copolymer of 50 to 95 parts of butadiene and 40 to 5 parts of vinylidene chloride.

2. The blend of claim 1 which contains 2 to 10 parts of copolymer of butadiene and vinylidene chloride.

3. The blend of claim 1 in which the toughener is a copolymer of 60 parts of butadiene and 40 parts of vinylidene chloride.

References Cited in the file of this patent

UNITED STATES PATENTS

| | | |
|---|---|---|
| 2,215,379 | Sebrell | Sept. 17, 1940 |
| 2,384,884 | Britton | July 18, 1941 |
| 2,614,094 | Wheelock | Oct. 14, 1952 |
| 2,719,137 | Tawney | Sept. 27, 1955 |

OTHER REFERENCES

Lowry: "Ind. Eng. Chem.," volume 41, pages 146–55 (1949).